US011809897B2

(12) United States Patent
Bregman et al.

(10) Patent No.: US 11,809,897 B2
(45) Date of Patent: Nov. 7, 2023

(54) CHAINED TRIGGERING OF BUILDS IN CONTINUOUS INTEGRATION ENVIRONMENTS

(71) Applicant: RED HAT, INC., Raleigh, NC (US)

(72) Inventors: Arie Bregman, Gan Yavne (IL); Ilan Gersht, Bat Yam (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/107,690

(22) Filed: Nov. 30, 2020

(65) Prior Publication Data

US 2022/0171651 A1 Jun. 2, 2022

(51) Int. Cl.
*G06F 9/48* (2006.01)
*G06F 9/451* (2018.01)
*G06F 3/0486* (2013.01)
*G06F 8/41* (2018.01)

(52) U.S. Cl.
CPC .......... *G06F 9/4843* (2013.01); *G06F 3/0486* (2013.01); *G06F 8/44* (2013.01); *G06F 9/451* (2018.02)

(58) Field of Classification Search
CPC ...... G06F 9/4843; G06F 9/451; G06F 3/0486; G06F 8/44
See application file for complete search history.

(56) References Cited

U.S. PATENT DOCUMENTS

| | | | |
|---|---|---|---|
| 10,452,435 B2 | 10/2019 | Novak et al. | |
| 10,601,905 B2 | 3/2020 | Bregman et al. | |
| 10,671,381 B2 | 6/2020 | Spektor et al. | |
| 2002/0075325 A1* | 6/2002 | Allor | G06F 3/0481 715/853 |
| 2006/0212857 A1* | 9/2006 | Neumann | G06F 8/20 717/140 |
| 2008/0309665 A1* | 12/2008 | Gregory, II | G06F 30/00 345/420 |
| 2014/0282450 A1* | 9/2014 | Jubran | G06F 8/443 717/151 |

(Continued)

OTHER PUBLICATIONS

Melinda-Carol Ballou, Jim Mercer, Arnal Dayaratna, "GitHub Actions adds CI/CD to Augment DevOps Pipeline Collaboration", https://resources.github.com/downloads/IDC-GitHub-Actions-adds-CI-CD-to-Augment-DevOps-Pipeline-Collaboration-1.pdf, IDC, Aug. 8, 2019.

(Continued)

*Primary Examiner* — Jennifer N Welch
*Assistant Examiner* — Reji Kartholy
(74) *Attorney, Agent, or Firm* — Lowenstein Sandler LLP

(57) ABSTRACT

The technology disclosed herein enables presenting, via a user interface, one or more builds, wherein each build comprises one or more first software build operations, and at least one first software build operation is currently executing, presenting, via the user interface, one or more computing jobs, wherein each job comprises one or more second software build operations, receiving, via the user interface, an input associating a job selected from the one or more jobs with a build selected from the one of the builds, and responsive to receiving the input, scheduling, execution of the second software build operations to occur in response to a completion of execution of the first software build operations. The input may be, for example, a drag-and-drop operation between the job and the build.

20 Claims, 6 Drawing Sheets

(56) References Cited

U.S. PATENT DOCUMENTS

| | | | | |
|---|---|---|---|---|
| 2016/0306618 A1* | 10/2016 | Bansod | ..................... | G06F 8/65 |
| 2018/0173525 A1* | 6/2018 | Suparna | ................... | G06F 8/77 |
| 2018/0314517 A1* | 11/2018 | Iwanir | ................ | G06F 11/3668 |
| 2019/0138280 A1* | 5/2019 | Ma | ........................... | G06F 8/60 |
| 2019/0171550 A1 | 6/2019 | Eizenman et al. | | |
| 2019/0235847 A1* | 8/2019 | Nguyen | ................... | G06F 8/60 |
| 2020/0028895 A1* | 1/2020 | Bregman | ............ | H04L 67/1004 |
| 2021/0208859 A1* | 7/2021 | Kapadia | ................ | G06F 3/0482 |

OTHER PUBLICATIONS

Josh Garverick and Willy Shaub, "Azure Pipelines What Is Azure Pipelines?", https://opdhsblobprod04.blob.core.windows.net/contents/da6516c50edb40f484075072c6e1503b/525c60f874bc5df3e34f00cccb4e2763?sv=2018-03-28&sr=b&si=ReadPolicy&sig=THPibEUUZNO6hxdrBbQN1pev6Wb%2FolFwwDLG0x3i56Q%3D&st=2020-08-31T15%3A59%3A09Z&se=2020-09-01T16%3A09%3A09Z, 2017, 1739 pages.

"Using Oracle Developer Cloud Service—Design and Use Job Pipelines", https://docs.oracle.com/en/cloud/paas/developer-cloud/csdcs/use-pipelines.html#GUID-8A6787EF-2D7E-4322-A7C9-00509920FC1C, Oracle, downloaded Sep. 1, 2020, 5 pages.

Itzik Gan Baruch, "How to Trigger Multiple Pipelines using GitLab CI/CD", https://about.gitlab.com/blog/2019/07/24/cross-project-pipeline/, Jun. 24, 2019, 9 pages.

* cited by examiner

CHAINED TRIGGERING OF BUILDS IN CONTINUOUS INTEGRATION ENVIRONMENTS

TECHNICAL FIELD

The present disclosure is generally related to build management, and more particularly, to controlling builds in continuous integration environments.

BACKGROUND

In computer program development, continuous integration is the practice of merging developer working copies of computer program code for an application into a shared mainline code base, generally, several times a day. Typically, with continuous integration, each computer program developer team member submits source code for the application being developed on a daily (or more frequent) basis, and a set of operations referred to herein as a build process ("build") is performed to produce executable code from the source code. The executable code may be for an application, for example. The set of operations for providing a build may include compiling source code files to produce the executable code for an application, performing tests on the executable code, and instating or deploying the executable code. The build process may be performed at periodic times, or with each significant source code change. Isolated source code changes can be tested as part of the build process when the source code is added to the larger mainline code base.

BRIEF DESCRIPTION OF THE DRAWINGS

The present disclosure is illustrated by way of examples, and not by way of limitation, and may be more fully understood with references to the following detailed description when considered in connection with the figures, in which.

Figure 1:
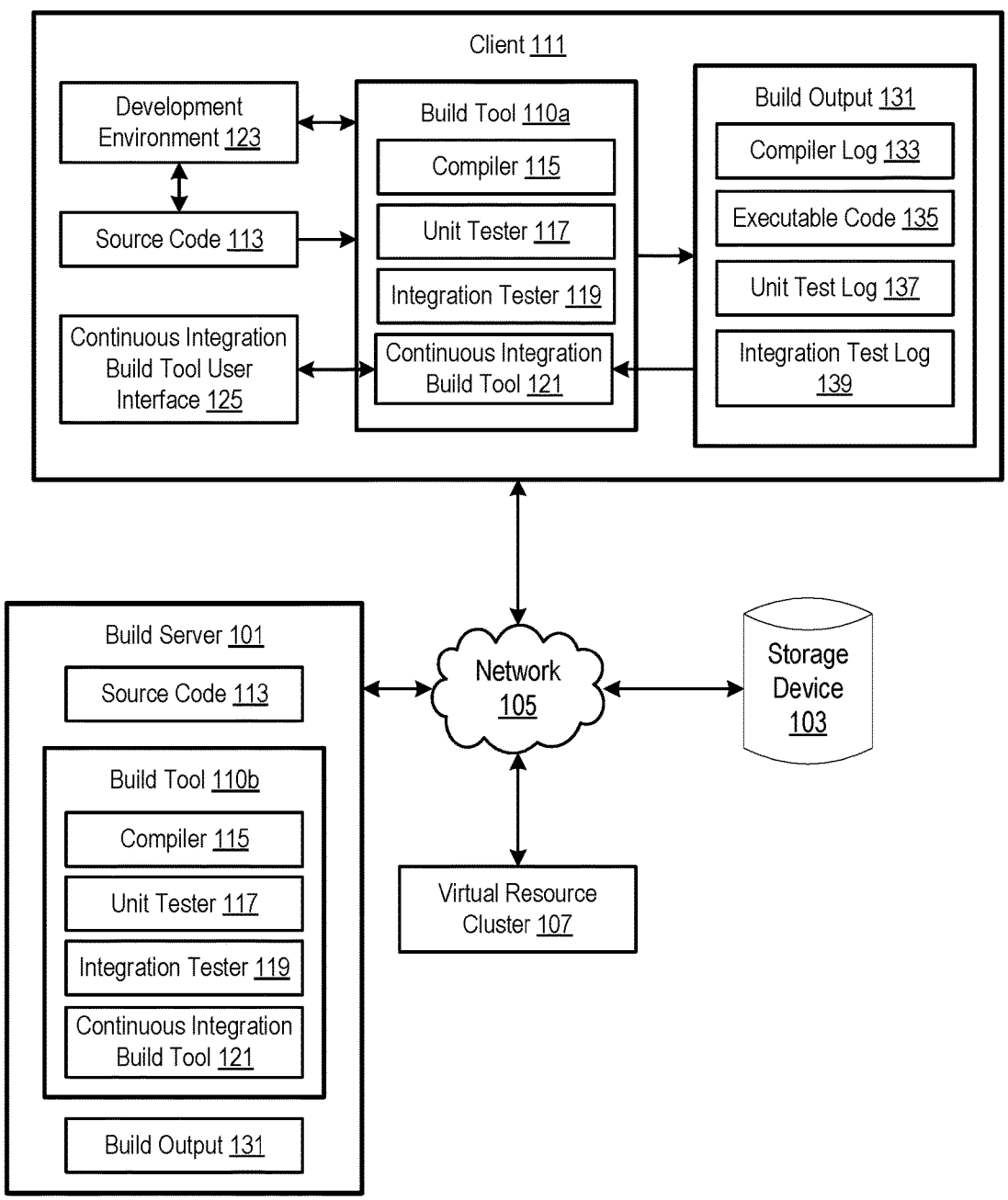
FIG. 1 depicts a high-level block diagram of an example computing environment that includes a continuous integration build tool user interface, in accordance with one or more aspects of the present disclosure

Continuous software integration tools such as JENKINS and the like, referred to herein as "build tools," can perform build processes to generate software images from source code and other data. Software images can be, for example, executable code of software application programs. Source code can include instructions in a programming language that can be translated to executable code. The translation from source code to executable code can be performed by compiler programs or the like. Other data can also be processed, e.g., transformed to suitable formats, and included in software images. A build process can cause the appropriate source code to be translated to executable code, and other data to be processed as needed to be included in the resulting software images. Instructions specifying how to perform the build process can be provided to the build tools in the form of build files, such as build scripts or declarative descriptions of the files to be built in terms of files from which they are built. A particular set of instructions specifying how to perform a particular build process are referred to herein as a build "job." A job can be executed, e.g., by a build tool, and the executing job is referred to herein as an "active build." A job can include a set of stages, which are ordinarily executed in sequence in an active build. A job can thus be referred to as a "pipeline" of one or more stages. The stages can include, for example, compile, test, and deploy stages. The compile stage may translate source code to executable code, the test stage may perform tests to verify that the executable code operates correctly, and the deploy stage may install the executable code on host machines or nodes, for example. A build can execute for a substantial period of time (e.g., several minutes to several hours or days).

Build tools can provide user interfaces that enable a user to start a build and control certain aspects of the build process, such as stopping an active build. However, existing tools do not provide user interfaces that can modify, extend, or otherwise configure running builds.

Existing build tool user interfaces enable a user to define jobs, which can be understood as instructions specifying how to perform a build. That is, in particular embodiments, a build refers to an executing job, and a build performs the job. Existing build tool user interfaces enable a user to define a job as a sequence of stages and specify that a second job is to be performed in response to completion of a first job. However, existing tools only enable such linking between jobs to be defined prior to starting the first job. That is, if the first job has already been started as an active build but has not been linked to the second job, existing build tool user interfaces do not allow the second job to be linked while the active build is executing. As a result of this limitation, users devote time and effort to monitoring an active build, e.g., by manually watching the status or output of the active build, until the active build completes. Users can then manually start another build (e.g., of the second job) after noticing that the active build has completed. This manual monitoring and starting of subsequent builds can be time-consuming distract to users of the build tools.

However, once a build has been invoked in the user interface, there's no way to request one or more second builds to be performed in response to execution or completion of the first build. In existing user interfaces, each build, e.g., execution of a pipeline, can only be started by a user interface interaction, such as selection of a command in the user interface to start the build. Existing user interfaces do not provide any features to modify the build queue based on output of an executing build. Existing user interfaces provides features to define a chain of builds prior to starting any of the builds, but once a build in the chain has been started, existing user interfaces cannot modify the chain.

In a build system user interface, active builds can be represented as names or icons displayed in the user interface. Jobs that can be executed can also be represented as names or icons in the user interface. An active build or a job can be selected by selected the corresponding name or icon in the user interface, e.g., using a mouse pointer, touch interaction, or other suitable user interface interaction.

Aspects of the present disclosure address the above-noted and other deficiencies by enhancing a build system with the ability to enables a user to select an active build and designate a job to be executed in response the active build ending. For example, the user can perform a drag-and-drop operation in a user interface of the build system by dragging an active build from a list of active builds and dropping the active build on a designated job. Subsequently, the build system executes the designated job in response to completion of the active build. The user interface also enables the user to select output parameters of the active build, and the build system provides the selected output parameters to the designated job in response to completion of the active build.

A job can include a set of stages, such as a compile stage that compiles source code to executable code, a test stage that performs tests using the executable code, and a deployment phase that makes the executable code available for use. The user interface enables the user to select a stage of an active build and designate a job to be executed in response to the selected stage ending. Thus, if the selected stage is not the final stage of the active build, then the designated job may be started prior to completion of the active build. The user can select the stage in the user interface, e.g., from a menu associated with the active build. The user can also select one or more additional jobs to be executed after the designated job ends, or after a particular stage of the designated job ends. Thus, the user can request that a chain of jobs be executed.

Various aspects of the above referenced methods and systems are described in details herein below by way of examples, rather than by way of limitation. The examples provided below discuss a code review manager that integrates a development environment with a code review system. In other examples, the methods and systems described herein can be performed by any suitable component that interacts with the development environment and the code review system. In other examples, the code review manager can receive code review comments from any system that provides code review comments, and communicate the code review comments to any suitable system that includes a source code editor, and send status information, such as an indication that a source code file corresponding to the comment has been edited, or the review comment has otherwise been addressed, to the system that provides code review comments.

FIG. 1 depicts a high-level block diagram of an example computing environment 100 that includes a continuous integration build tool user interface 125, in accordance with one or more aspects of the present disclosure. The computing environment 100 can provide build management services that include executing build operations to perform builds of source code 113 to produce build output 131. The builds can be performed in accordance with instructions provided by the continuous integration build tool user interface 125. The computing environment 100 can include a build server 101 for running the sets of operations for providing builds in a continuous integration environment. The builds can be for source code 113, e.g., of an application that is being developed. An application can be, for example, a web application, a desktop application, a browser application, etc. An application can be a messaging application, a video application, a social networking application, video sharing application, photo sharing application, chat application, mobile application of a content provider or any combination of such applications. An application can be a computationally large or data-intensive application, such as a forecasting application, a modeling application, a data analysis application, etc. The build server 101 can be hosted on a computing device such as a server computer, a desktop computer, a portable computing device such as, and not limited to, netbooks, laptop computers, and the like.

A build tool 110 can be located on a client 111, on a build server 101, or both. Each build tool 110 can execute a set of operations to provide the build of the mainline code base. The set of operations may include compiling the code, testing the code when the code is compiled, testing isolated code when the code is added to the larger mainline code base, and performing continuous build operations e.g., performing a build a periodic intervals or in response to user requests, and presenting information about the status of executing builds and the results of completed builds.

Users, such as computer program developer team members, can use a development environment 123 to submit source code 113 to the build tool 110a located on the client 111 or to the build tool 110b located on the build server 101. Users can submit source code to the build tool 110b located on the build server 101 from clients 111 via network 105. The build tool 110 or other tool (e.g., a version control tool) can merge the submitted source code 113 with a shared mainline code base that is being stored and maintained by the build server 101. Users can submit source code 113 to any of the build tools 110 on a daily (or more frequent) basis, and request execution of a build process for the submission.

A client machine 111 can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 can be a private network (e.g., a local area network (LAN), a wide area network (WAN), intranet, or other similar private networks) or a public network (e.g., the Internet).

The build tool 110 can include a compiler 115 to compile computer source code 113 into executable code 135, and to generate other build output 131 from the compiling and linking of the source code 113, such as a compiler log 133 that contains output describing progress and results of the compilation process. The build tool 110 can include a unit tester 117 and an integration tester 119 for running automated tests on the artifacts. The unit tester 117 can test that the individual functions in the source code 113 or executable code 135 work properly and generate a unit test log 137 that contains output describing progress and results of the unit tester 117. The integration tester 119 can test the executable code 135 in an environment in which the executable code 135 is expected to be executed by users. The build tool can include a continuous integration build tool 121 for performing continuous build operations e.g., performing a build a periodic intervals or in response to user requests, and presenting information about the status of executing builds and the results of completed builds. The continuous integration build tool 121 can start builds, e.g., by executing the compiler 115, unit tester 117, and integration tester 119 in accordance with a build configuration script that contains instructions for compiling the source code and testing the resulting executable code 135. The continuous integration build tool 121 can monitor build output 131 and display progress information, such as the stage of the build (e.g., compiling, unit testing, or integration testing), the status of an executing build (e.g., how many files have been compiled, how many tests have passed, and how many tests have failed). The continuous integration build tool 121 can detect the completion of a build by receiving a result value from the compiler 115, unit tester 117, and integration tester 119, or by detecting particular text in the build output logs, for example. The continuous integration build tool 121 can generate an integration test log 139 containing information describing the progress of the operations performed by the continuous integration build tool 121.

The integration tester 119 can create a virtual resource cluster 107 for the integration testing of the artifacts. The virtual resource cluster 107 can be based on a container model and/or a virtual machine (VM) model. The virtual resources in the cluster 107 can be containers, virtual machines, container(s) within a virtual machine, and/or virtual machine(s) within a container. A container can refer to an isolated set of resources allocated to executing an application and/or process independent from other applications and/or processes. A virtual machine can be a virtualization of a machine (computer) that includes its own operating system (referred to as a guest operating system) and executes application programs. A host machine can host one or more virtual resources for virtualizing one or more application servers for executing the artifacts for the application for the integration testing.

In one example, the host machine for the cluster 107 may be the same computing machine that hosts the build server 101. In another example, there are one or more host machines for the cluster 107 that are computing machine(s) other than the computing machine that hosts the build server 101. In another example, there are multiple host machines for the cluster 107 that include the computing machine that hosts the build server 101 and one or more computing machines other than the computing machine that hosts the build server 101. The computing machines can be server computer systems, desktop computers or any other computing devices.

A host machine can allocate a certain amount of its resources to individual virtual resources (e.g., virtual machine, container), and can multiplex the underlying hardware (e.g., infrastructure) of the host machine among the virtual resources on the host machine. For a virtual machine, the layer providing the virtualization is commonly referred to as a hypervisor and is also known as a virtual machine monitor (VMM), a kernel-based hypervisor, or part of a host operating system. The hypervisor can emulate the underlying hardware (e.g., infrastructure) of the host machine, making use of the virtual machine.

The application in the container can run under the host operating system. The host machine for the container can include a container engine to create and manage the containers. In one implementation, a container can run on a virtual machine to provide an extra layer of separation between applications running on a guest operating system of the virtual machine. In one implementation a virtual machine can run on a container to maintain isolation and security properties of virtual machines while being able to package and distribute computer programs as a container.

The integration tester 119 can run the executable code 135 in the cluster 107, and run integration tests against the distributed system being provided by the cluster 107. After the build tool 110 compiles the source code 113 and runs unit tests and integration tests, the build tool 110 can report whether the attempt to provide the build was a success or includes a failure. A failure can be caused by the compiling of the source code failing, unit testing failing, and/or integration testing failing.

Figure 2A:
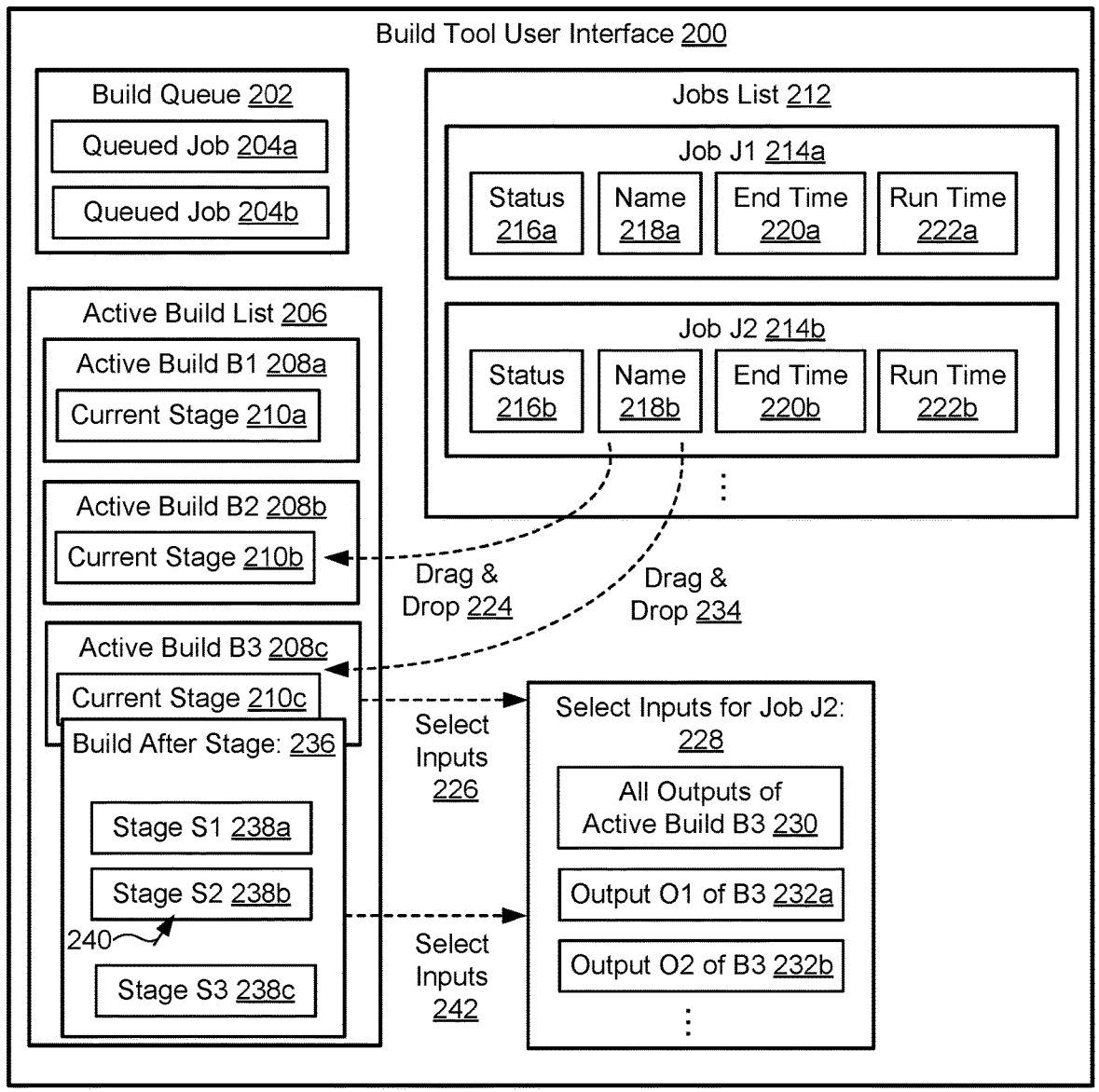
FIG. 2A depicts an example user interface of a continuous integration build tool with drag-and-drop job scheduling features, in accordance with one or more aspects of the present disclosure.

FIG. 2A depicts an example user interface 200 of a continuous integration build tool with drag-and-drop job scheduling features, in accordance with one or more aspects of the present disclosure. The build tool user interface 200 enables a user to start one or more active builds, which may be understood as being executing instances of build jobs. The build tool user interface 200 presents an active build list 206, a build queue list 202, and a jobs list 212. The jobs list 212 includes one or more job representations 214 (also referred to herein as "jobs" when referenced in the context of the jobs list 212), which are user-interface representations of jobs that a build tool 110 can execute to perform builds. The instructions can be provided to build tools in the form of build files, such as build scripts or declarative descriptions of the files to be built in terms of files from which they are built. A job can be executed, e.g., by the build tool 110, and the executing job is referred to herein as an "active build." A job can include a set of stages, which are ordinarily executed in sequence in an active build. The stages can include, for example, compile, test, and deploy stages. The compile stage may translate source code to executable code, the test stage may perform tests to verify that the executable code operates correctly, and the deploy stage may install the executable code on host machines or nodes, for example.

Each job 214 in the jobs list 212 includes job-related information, such as a job status 216, a name job 218, an end time 220, and a run time 222. The job status 216 may be, e.g., running to indicate that an active build is executing the job 218, or a cumulative status, e.g., a number of active builds that have successfully executed the job 218 and a number of active builds that have failed to successfully execute the job 218. The job name may be a descriptive name of the job, e.g., "Message Processor" for a job that builds a message processor application. The end time 220 may be a time and date at which the most recent active build of the job 214 ended. The run time 222 may be a total amount of time for which active build of the job 214 have executed, e.g., since the job 214 was created. The job 214 may also include a definition of job stages (not shown), e.g., a script that specifies the name of each stage and commands to perform for each stage.

The active build list 206 can include one or more active build representations 208 (also referred to herein as "active builds" 208 when referenced in the context of the active build list 206). Each active build 208 in the active build list 26 can be displayed as, for example, the name of an active build ("Build B1"), the name of the corresponding job 214 being run in the active build, the date and time at which the active build started, an icon representing an active build, or a combination of those. An active build 208 is presented in the active build list 206 while the corresponding job is being run. An active build can execute for a substantial period of time (e.g., several minutes, several hours, or several days). An active build 208 is presented in response to an execution of the corresponding job being started, and is removed from the active build list 206 in response to completion of the execution of the corresponding job. Each active build 208 may include a current stage 210, which may be a name or other identifier of the stage of the corresponding job that is being executed.

The build queue 202 displays jobs that are waiting to be executed, if any. Jobs in the build queue 202 can be removed from the build queue 202 when active builds of the jobs begin. The active builds can then be added to the active build list.

A user can select a job 214 and designate an active build 208 to cause the build tool 110 to execute the instructions of the selected job 214 in response the active build 208 ending. That is, the build tool 110 will execute the instructions of the selected job 214 in response to the designated active build 208 ending. For example, the user can perform a drag-and-drop operation 224 by dragging a job 214b from a list of jobs 212 and dropping the job 214b on a designated active build 208b to cause a build tool 100 to execute the job 214b subsequently to the designated active build 208b. For example, the drop operation in the user interface 200 can cause the build tool 100 to execute the job 214b in an active build in response to completion of the designated active build 208b. In response to the designated active build ending, the build tool 110 executes the job 214b, and can provide the output of the designated active build 208b to the job 214b as input. Alternatively or additionally, a drag-and-drop operation in the reverse direction, from the active build 208b to the job 214b, can also cause the build tool 110 to execute the job 214b, and provide the output of the designated active build 208b to the job 214b as input. In other embodiments, a drag-and-drop operation from the job 214b to the build queue 202 can cause the job 214b to be added to the build queue. The build tool 110 executes the jobs in the build queue as processor resources become available. Thus an active build 208 is created for the job 214b in response to the build tool 110 executing the build instructions of the job 214b, which occurs in response to sufficient processor resources to execute the job becoming available. Sufficient processor resources may be, for example, an idle processor or idle processor core. Further, if no processor resources are available to execute a job 214 in response to a drag-and-drop of the job 214 to an active build 208, the job 214 is added to the build queue and executed in response to completion of the active build 208 and sufficient processor resources to execute the job becoming available.

Subsequent to the drag and drop operation 224, the user can optionally designate a particular stage after which the job 214b is to be performed, as described below. Further, subsequent to the drag and drop operation 224, the user can optionally select one or more input parameters to be provided to the job 214b. The inputs may be selected from the output parameters of the active build 208b. After the drag and drop operation 224, the user can select (e.g., click, hover over, or touch) a button or other user interface element (arrow 226) to cause a list of output parameters of the active build 208b to be displayed. The list of output parameters can be displayed in an input parameter selection menu 228 with a message such as "Select inputs for Job J2" (where J2 is the name of the job 214b). The input parameter selection user interface element 228 may display an option 230 to provide all outputs of the active build 230 to the job 214b, an option 232a to provide a particular first output parameter ("O1") to the job 214b, an option 232b to provide a particular second output parameter ("O2") to the job 214b, and so on. The user may select one or more of the options. The build tool 110 provides the values of the selected parameters to the job 214b from the corresponding output parameters of the active build 20b in response to starting execution of the job 214b.

A user can select a job 214 and designate a stage of an active build 208 to cause the build tool 110 to execute the instructions of the selected job 214 in response the stage of the active build 208 ending. That is, the build tool 110 will execute the instructions of the selected job 214 in response to the designated stage of the active build 208 ending. For example, the user can perform a drag-and-drop operation 234 by dragging a job 214b from a list of jobs 212 and dropping the job 214b on a designated active build 208c to cause a build tool 100 to execute the job 214b subsequently to the designated active build 208c (or any other active build 208). Subsequent to the drag and drop operation 234, the user may designate a stage 238 from a "Build After Stage" user interface element 236 to cause the build tool 100 to execute the job 214b in an active build in response to completion of the designated stage of the active build 208b. In response to the designated stage of the active build 208c ending, the build tool 110 executes the job 214b, and can provide the output of the designated stage to the job 214b as input. The "Build After Stage" user interface element 236 may be presented in response to the drag and drop operation 234 (e.g., if the active build has multiple stages, or a configuration option specifies that the "Build After Stage" user interface is to be presented automatically). Alternatively, after the drag and drop operation 224, the user can select (e.g., click, hover over, or touch) a button or other user interface element (arrow 242) to cause the "Build After Stage" user interface element 236 to be displayed. The "Build After Stage" user interface element 236 lists the stages of the active build 208c, which are "Stage S1" 238a, "Stage S2" 238b, and "Stage S3" 238c. In this example, the user designates "Stage S2" 238b, as shown by the arrow 240. As a result, the build tool 110 executes the instructions of the job 214b after completion of stage S2 of the active build 208c. Since stage S2 is not the last stage of the active build 208c, the instructions of the job 214b begin execution prior to completion of the active build 208c.

After the user selects the stage (arrow 240), the user can select (e.g., click, hover over, or touch) a button or other user interface element (arrow 242) to cause a list of output parameters of the active build 208b to be displayed in an input parameter selection user interface element 228. The user can select one or more of the output parameters to be provided as input parameters to the job 214b, as described above with respect to arrow 226. The user can repeat the above selection process to select one or more additional jobs 214 to be executed after the selected active build or the selected stage of the selected active build. Thus, the user can request that a chain of jobs be executed.

Figure 2B:
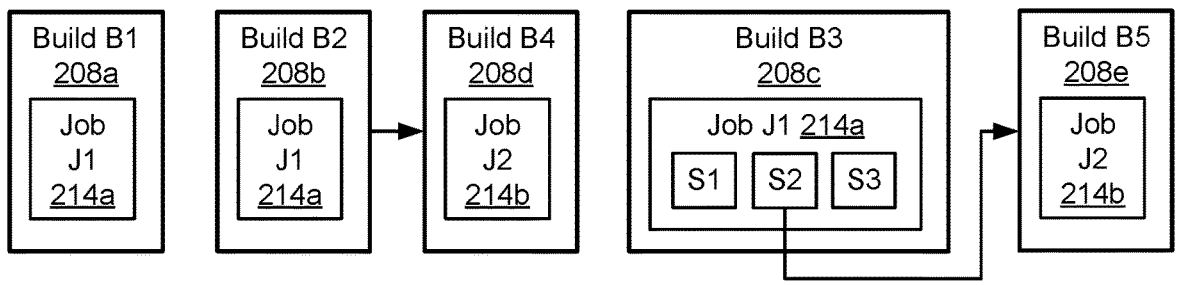
FIG. 2B depicts example active builds and execution of jobs in active builds in response to completion of earlier active builds, in accordance with one or more aspects of the present disclosure.

FIG. 2B depicts example active builds 208 and execution of jobs 214 in active builds in response to completion of earlier active builds, in accordance with one or more aspects of the present disclosure. The active builds 208 shown in FIG. 2B correspond to the active builds described above with respect to FIG. 2A. Referring to FIG. 2B, active builds B1 208a, B2 28b, and B3 208c each execute the instructions of job J1 214a.

As a result of the drag and drop operation 224 from job J2 to active build B2, an active build B4 208d is created and executed in response to completion of active build B2, as shown by the arrow from active build B2 208b to active build B4 208d. Active build B4 208d executes the instructions of job J2 subsequent to active build B2 because the drag and drop operation 224 associates job J2 214b with active build B2 208b.

Further, as a result of the drag and drop operation 234 from job J2 to stage S2 of active build B3, an active build B5 208e is created and executed in response to completion of stage S2 of active build B3, as shown by the arrow from stage S2 of job J1 214a of build B3 208c to build B5 208e. Active build B5 executes the instructions of job J2 subsequent to stage 2 of active build B3 because the drag and drop operation 234 associates job J2 214b with stage S2 of active build B3 208c.

Figure 3:
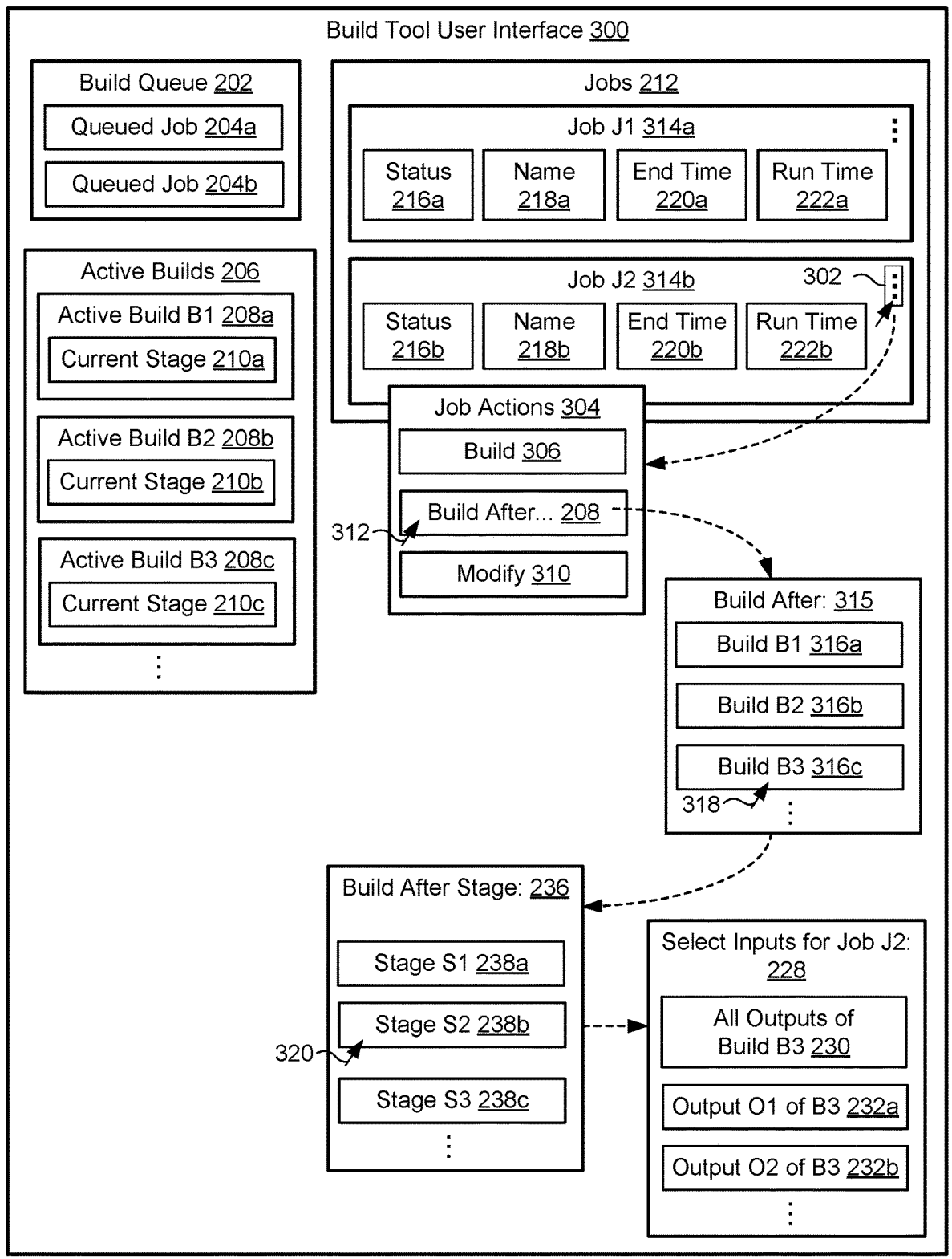
FIG. 3 depicts an example job scheduling user interface of a continuous integration build tool, in accordance with one or more aspects of the present disclosure.

FIG. 3 depicts an example job scheduling user interface 300 of a continuous integration build tool, in accordance with one or more aspects of the present disclosure. The user interface 300 includes a jobs list 212, active builds list 206, and build queue 202 as described above with respect to FIG. 2A. The jobs list 202 includes jobs 314a, 314b, which are similar to the jobs 214a, 214b of FIG. 2A. Each of the jobs 314a, 314b includes an action menu activation element 302. The user interface 300 presents a "Job Actions" menu 304 for a job 314b in response to a user selecting the action menu activation element 302 of the job 314b. The "Job Actions" menu 304 presents action choices that the user can select to perform the associated action for the job 314b. The actions include Build 306, which can cause the build tool 110 to start a build of the associated job 314b, e.g., without waiting for an active build to complete. The actions also include "Build After" 208, which can cause the build tool 110 to schedule a build of the associated job 314b to occur after a designated active build or after a designated stage of an active build. The user can designate an active build by selecting the "Build After" action of the "Job Actions" menu 304 (arrow 312). The user interface 300 then displays a "Build After" menu 315 that lists each of the active builds 206. The user can select one of the active builds from the "Build After" menu 315 to specify that job 314b is to be built responsive to completion of the selected active build. In this example, the user selects "Build B3" 316c (arrow 318). The user interface then presents a "Build After Stage" menu 236, which includes a list of stages 238 of the active build that was selected from the "Build After" menu 315. In this example, the list of stages 238 includes "Stage S1" 238a, "Stage S2" 238b, and "Stage S3" 238c. The user can select one of the stages 238 to specify that the job 314b is to be built responsive to completion of the selected stage. In this example, the user has selected "Stage S2" 238b (arrow 320). Thus, the build tool 110 will start the job 314b in response to completion of stage S2 active build B3 208c. The user may also specify inputs for job 314b by selecting one of the options from a parameter selection menu 228, as described above with respect to FIG. 2A. For example, to cause the build tool 110 to provide all outputs of build B3 232a to job 314b as input, the user can select the "All Outputs of Build B3" option 230. As another example, to cause the build tool 110 to provide output parameter O1 or build B3 to job 314b as input, the user can select the "Output O1 of B3" option 232a.

The user can repeat the selection process described above to select one or more additional jobs 314 to be executed after the selected active build (e.g., active build B3 208c) or stage (e.g., stage S2 of active build B3 28c). Thus, the user can request that a chain of jobs be executed.

Figure 4:
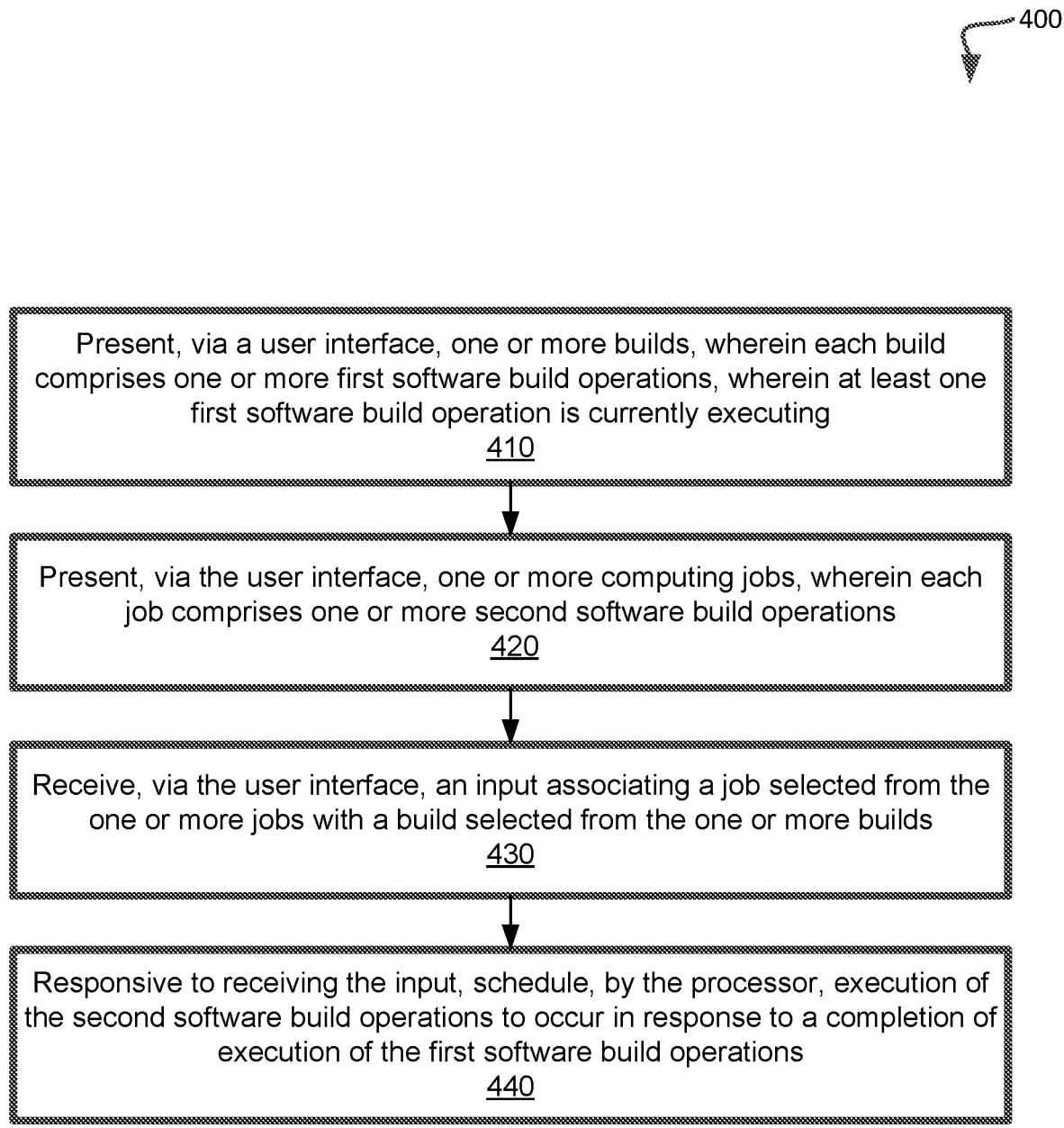
FIG. 4 depicts a flow diagram of an example method for scheduling build jobs, in accordance with one or more aspects of the present disclosure.

FIG. 4 depicts a flow diagram of an example method 400 for scheduling jobs, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a host computer system may present, via a user interface, one or more builds, wherein each build comprises one or more first software build operations, wherein at least one first software build operation is currently executing.

At block 420, the host computer system may present, via the user interface, one or more computing jobs, wherein each job comprises one or more second software build operations.

At block 430, the host computer system may receive, via the user interface, an input associating a job selected from the one or more jobs with a build selected from the one or more builds. The input may be a drag-and-drop operation between the job and the build or other user interface operation(s). For example, as shown in FIG. 3, an input associated with the job 314b, such as a mouse click, a touch interaction, a selection of the element 302, or hovering a mouse pointer over the job 314b may cause a "Job Actions" menu 304 to be displayed. The "Job Actions" menu includes a Build After" . . . " menu option 208. The host computer system may present, via the user interface, a selectable user interface element in visual association with the job. For example, the host computer system may present the "Build After" menu item 208.

Responsive to selection of the selectable user interface element, the host computer system may present, via the user interface, the one or more builds in visual association with the job. For example, the host computer system may present the builds 316 shown in the "Build After" menu 315. To receive the input associating the job selected from the one or more jobs with the build selected from the one or more builds, the host computer system may receive selection of the build from the one or more builds presented in visual association with the job.

The host computer system may present, via the user interface, one or more build stages of the build in visual association with the build. For example, as shown in FIG. 3, the host computer system may present stages 238 in a "Build After Stage" menu 236. The host computer system may receive, via the user interface, selection of a selected one of the build stages of the build. The host computer system may schedule execution of the second software build operations to occur in response to a completion of the one or more of the first software build operations included in the selected one of the build stages.

The host computer system may present, via the user interface, an input selection interface comprising one or more input parameters of the one or more second software build operations of the build. For example, the host computer system may present the "Select Inputs for Job J2" menu 228 of FIG. 3. The host computer system may receive, via the user interface, selection of one or more of the input parameters, and, for each of the selected input parameters, providing one or more output parameters that correspond to the selected input parameter. Thus, the selected one or more of the input parameters of the second software build process may be linked to the one or more output parameters of the first software build process. Subsequently, in response to completion of execution of the first software build operations (or execution of the second software build operations), the first software build process may generated one or more output values that correspond to the output parameters. The output values may be provided to the second software build operations as one or more input values that correspond to the selected input parameters.

At block 440, the host computer system may, responsive to receiving the input, schedule, by the processor, execution of the second software build operations to occur in response to a completion of execution of the first software build operations. The host computer system may detect completion of execution of the first software build operations by, for example, receiving a notification or other indication from a build tool via a programming interface of the build tool that performs the first software build operations, e.g., a compiler, script, test system, deployment system, or other process. Alternatively or additionally, the host computer system may detect completion of execution of the first software build operations by monitoring output of the build tool for predetermined content, such as text, indicating that the build tool has completed execution of the first software build operations. The build output may one or more files, which may be monitored by reading data from the end of the file, e.g., at periodic intervals or in response to a notification indicating the file has changed. Responsive to completing the operations described herein above with references to block 440, the method may terminate.

Figure 5:
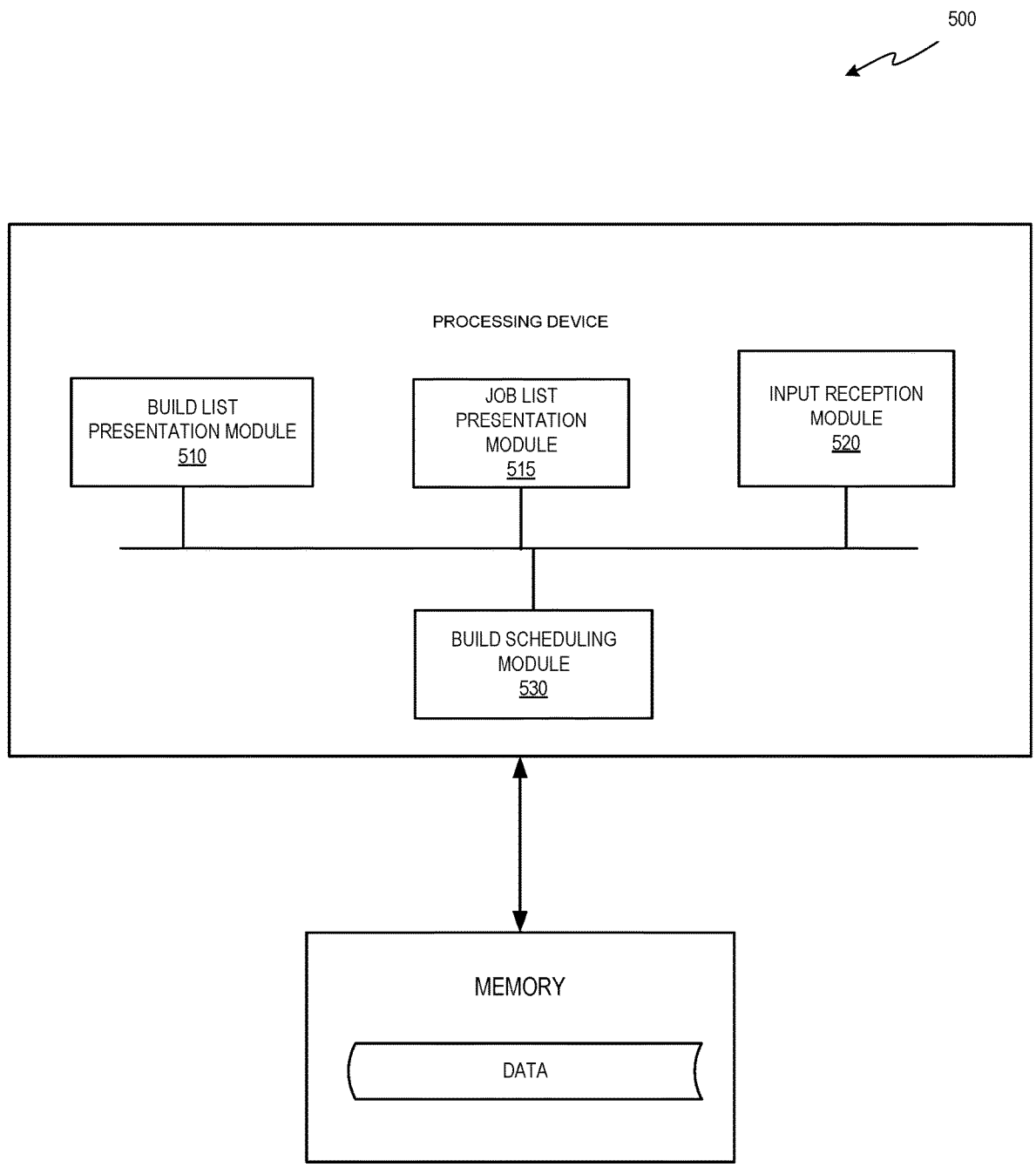
FIG. 5 depicts a block diagram of a computer system operating in accordance with one or more aspects of the present disclosure.

FIG. 5 depicts a block diagram of a computer system 500 operating in accordance with one or more aspects of the present disclosure. One or more of the components of FIG. 1 may execute on computer system 500. Computer system 500 may be the same or similar to client 111 or build server 101 of FIG. 1, and may include one or more processors and one or more memory devices. In the example shown, computer system 500 may include a build list presentation module 510, a job list presentation module 515, an input reception module 520, and a build scheduling module 530.

Build list presentation module 510 may enable a processor to present, via a user interface, one or more builds, wherein each build comprises one or more first software build operations, wherein at least one first software build operation is currently executing. Job list presentation module 515 may enable the processor to present, via the user interface, one or more computing jobs, wherein each job comprises one or more second software build operations. Input reception module 520 may cause the processor to receive, via the user interface, an input associating a job selected from the one or more jobs with a build selected from the one or more builds. Build scheduling module 530 may enable the processor to, responsive to receiving the input, schedule execution of the second software build operations to occur in response to a completion of execution of the first software build operations.

Figure 6:
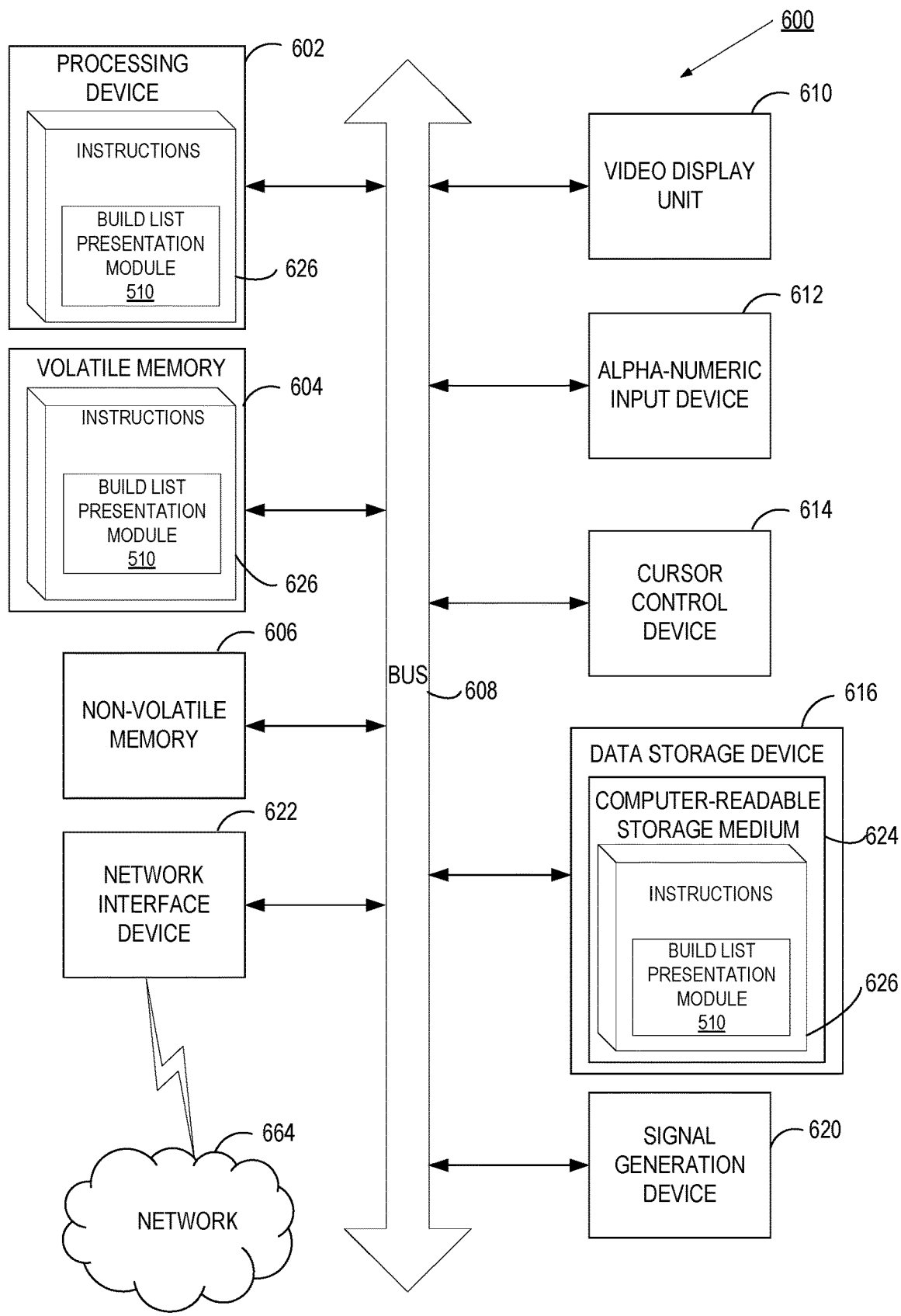
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 600 may correspond to computing environment 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
presenting, by a processor, via a user interface, one or more active builds, wherein each active build comprises one or more build stages, and each build stage includes one or more first software build operations, wherein at least one of the first software build operations is currently executing;
presenting, by the processor, via the user interface, one or more computing jobs, wherein each computing job comprises one or more second software build operations;
receiving, via the user interface, inputs designating a selected computing job, a selected active build, and a selected build stage of the selected active build, wherein the selected computing job is selected from the one or more computing jobs, the selected active build is selected from the one or more active builds, and the selected build stage is selected from the one or more build stages of the selected active build; and
responsive to receiving the input designating the selected computing job, the selected active build, and the selected build stage, adding the selected computing job to a build queue, wherein adding the selected computing job to the build queue causes the selected computing job to be executed in response to completion of one or more of the first software build operations included in the selected build stage of the selected active build.

2. The method of claim 1, wherein the input comprises a drag-and-drop operation between the selected computing job and the selected active build.

3. The method of claim 1, further comprising:
presenting, by the processor, via the user interface, an input selection interface comprising one or more input parameters of the one or more second software build operations of the selected computing job;
receiving, via the user interface, selection of one or more of the input parameters; and
for each of the selected input parameters, providing, to the selected computing job, one or more output parameters that correspond to the selected input parameter in response to starting execution of the selected computing job.

4. The method of claim 1, further comprising:
presenting, by the processor, via the user interface, a selectable user interface element in visual association with the selected computing job; and
responsive to selection of the selectable user interface element, presenting, via the user interface, the one or more builds in visual association with the selected computing job,
wherein receiving, via the user interface, the input selecting the selected computing job from the one or more computing jobs and the selected active build from the one or more active builds comprises receiving selection of the selected active build from the one or more active builds presented in visual association with the selected computing job.

5. The method of claim 1, further comprising:
presenting, by the processor, via the user interface, one or more build stages of the selected active build in visual association with the selected active build.

6. The method of claim 5, wherein the input designating the selected one of the build stages of the selected active build is included in the input received via the user interface.

7. The method of claim 5, further comprising:
responsive to receiving, via the user interface, the input designating the selected one of the build stages of the active build, presenting, by the processor, via the user interface, an input selection interface comprising one or more input parameters of the one or more second software build operations of the selected computing job;
receiving, via the user interface, selection of one or more of the input parameters; and
for each of the selected input parameters, providing, to the selected computing job, one or more output parameters that correspond to the selected input parameter in response to starting execution of the selected computing job.

8. A system comprising:
a memory; and
a processing device communicably coupled to the memory, the processing device to:
present, via a user interface, one or more active builds, wherein each active build comprises one or more build stages, and each build stage includes one or more first software build operations, wherein at least one of the first software build operations is currently executing;
present, via the user interface, one or more computing jobs, wherein each computing job comprises one or more second software build operations;
receive, via the user interface, inputs designating a selected computing job, a selected active build, and a selected build stage of the selected active build, wherein the selected computing job is selected from the one or more computing jobs, the selected active build is selected from the one or more active builds, and the selected build stage is selected from the one or more build stages of the selected active build; and
responsive to receiving the input designating the selected computing job, the selected active build, and the selected build stage, add the selected computing job to a build queue, wherein adding the selected computing job to the build queue causes the selected computing job to be executed in response to completion of one or more of the first software build operations include in the selected build stage of the selected active build.

9. The system of claim 8, wherein the input comprises a drag-and-drop operation between the selected computing job and the selected active build.

10. The system of claim 8, wherein the processing device is further to:
present, via the user interface, an input selection interface comprising one or more input parameters of the one or more second software build operations of the selected computing job;
receive, via the user interface, selection of one or more of the input parameters; and
for each of the selected input parameters, provide, to the selected computing job, one or more output parameters that correspond to the selected input parameter in response to starting execution of the selected computing job.

11. The system of claim 8, wherein the processing device is further to:
present, via the user interface, a selectable user interface element in visual association with the selected computing job; and
responsive to selection of the selectable user interface element, present, via the user interface, the one or more builds in visual association with the selected computing job,
wherein to receive, via the user interface, the input selecting the selected computing job from the one or more computing jobs and the selected active build from the one or more active builds comprises receiving selection of the selected active build from the one or more active builds presented in visual association with the selected computing job.

12. The system of claim 8, wherein the processing device is further to:
present, via the user interface, one or more build stages of the selected active build in visual association with the selected active build.

13. The system of claim 12, wherein the input designating the selected one of the build stages of the selected active build is included in the input received via the user interface.

14. The system of claim 12, wherein the processing device is further to:
responsive to receiving, via the user interface, selection of the selected one of the build stages of the active build, present, via the user interface, an input selection interface comprising one or more input parameters of the one or more second software build operations of the selected computing job;
receive, via the user interface, selection of one or more of the input parameters; and
for each of the selected input parameters, provide, to the selected computing job, one or more output parameters that correspond to the selected input parameter in response to starting execution of the selected computing job.

15. A non-transitory machine-readable storage medium storing instructions that cause a processing device to:
present, via a user interface, one or more active builds, wherein each active build comprises one or more build stages, and each build stage includes one or more first software build operations, wherein at least one of the first software build operations is currently executing;
present, via the user interface, one or more computing jobs, wherein each computing job comprises one or more second software build operations;
receive, via the user interface, inputs designating a selected computing job, a selected active build, and a selected build stage of the selected active build, wherein the selected computing job is selected from the one or more computing jobs, the selected active build is selected from the one or more active builds, and the selected build stage is selected from the one or more build stages of the selected active build; and
responsive to receiving the input designating the selected computing job, the selected active build, and the selected build stage, add the selected computing job to a build queue, wherein adding the selected computing job to the build queue causes the selected computing job to be executed in response to completion of one or more of the first software build operations included in the selected build stage of the selected active build.

16. The non-transitory machine-readable storage medium of claim 15, wherein the input comprises a drag-and-drop operation between the selected computing job and the selected active build.

17. The non-transitory machine-readable storage medium of claim 15, wherein the instructions further cause the processing device to:
present, via the user interface, an input selection interface comprising one or more input parameters of the one or more second software build operations of the selected computing job;
receive, via the user interface, selection of one or more of the input parameters; and
for each of the selected input parameters, provide, to the selected computing job, one or more output parameters that correspond to the selected input parameter in response to starting execution of the selected computing job.

18. The non-transitory machine-readable storage medium of claim 15, wherein the instructions further cause the processing device to:
present, via the user interface, a selectable user interface element in visual association with the selected computing job; and
responsive to selection of the selectable user interface element, present, via the user interface, the one or more builds in visual association with the selected computing job,
wherein to receive, via the user interface, the input selecting the selected computing job from the one or more computing jobs and the selected active build from the one or more active builds comprises receiving selection of the selected active build from the one or more active builds presented in visual association with the selected computing job.

19. The non-transitory machine-readable storage medium of claim 15, wherein the instructions further cause the processing device to:
present, via the user interface, one or more build stages of the selected active build in visual association with the selected active build.

20. The non-transitory machine-readable storage medium of claim 19, wherein the input designating the selected one of the build stages is included in the input received via the user interface.

* * * * *